2 Sheets--Sheet 1.

P. H. WEIDERSUM.

Check Hook for Harness Saddles.

No. 124,408.  Patented March 5, 1872.

Witnesses

Inventor

2 Sheets--Sheet 2.

P. H. WEIDERSUM.

Check Hook for Harness Saddles.

No. 124,408.　　　　　　　　　　　Patented March 5, 1872.

Witnesses　　　　　　　　　　　　　Inventor

UNITED STATES PATENT OFFICE.

PHILIP H. WIEDERSUM, OF NEW YORK, N. Y., ASSIGNOR TO WIEDERSUM MANUFACTURING COMPANY, OF SAME PLACE.

IMPROVEMENT IN CHECK-HOOKS FOR HARNESS-SADDLES.

Specification forming part of Letters Patent No. 124,408, dated March 5, 1872.

SPECIFICATION.

*To all whom it may concern:*

Be it known that I, PHILIP H. WIEDERSUM, of New York, in the county of New York and State of New York, have invented certain new and useful Improvements in Check-Hooks for Saddle-Trees; and I do hereby declare that the following is a full, clear, and exact description thereof, reference being had to the accompanying drawing, and to the letters of reference marked thereon, which form a part of this specification.

The nature of my invention consists in the peculiar mode of securing check-hooks to saddle-trees, as will hereinafter be fully set forth.

In order to enable others skilled in the art to which my invention appertains, to make and use the same, I will now proceed to describe its construction and operation, referring to the annexed drawing, in which—

Figure 1:
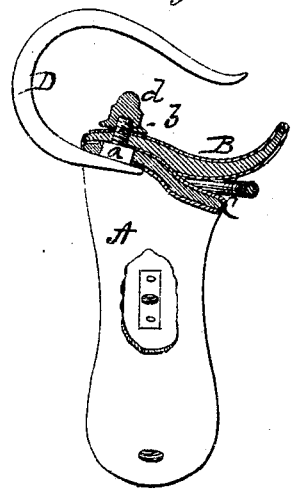
Figure 2:
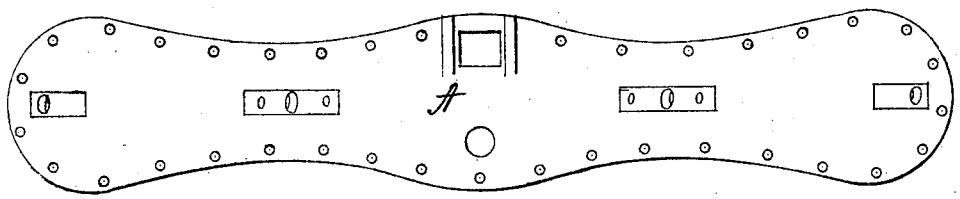
Figure 3:
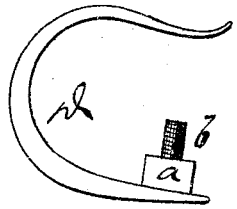
Figure 4:
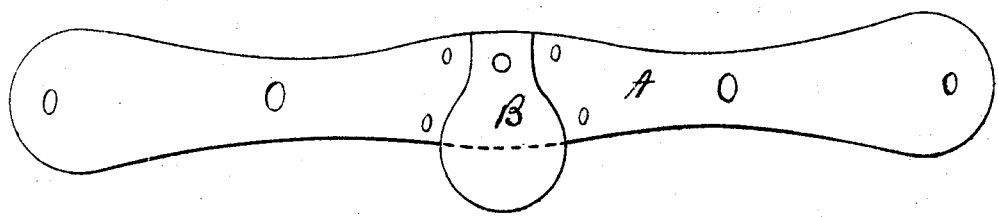

Figure 1 is a central cross-section, and Fig. 2 is a view of the under-side of the saddle-tree; Fig. 3 is an enlarged side view of the check-hook, and Fig. 4 is a plan view of the tree.

A represents the saddle-tree for double-harness, which is raised in the center and provided with a cantle, B. This cantle may be attached in two ways. When the top-covering C is made in two pieces or jockeys, a screw may be passed from underneath through the tree to the cantle; but, when the top C is made in one continuous strip the tree may be made narrower, and then a pin is formed to project upward from the tree, through said top, and into a hole in the under side of the cantle. Either of these modes, however, forms only one-half of the fastening for the cantle. The other half is formed of the check-hook D, upon the inner end of which is a square bolt-head, *a*, and screw *b*. This bolt-head and screw is formed solid with the hook, so that when passed upward through the tree A and cantle B the hook cannot turn. It is fastened by means of an ornamental nut, *d*, screwed on to the upper end of the screw *b* on top of the cantle. This, in addition to holding the hook in place, holds the cantle firmly in position, while the screw or pin before spoken of prevents it from turning. The tree A may or may not be provided with tack-holes for fastening the covering and pad. Where there are tack-holes the flaps go under the tree, while when tack-holes are not used the flaps go between the jockeys and the tree. It will thus be seen that, by raising the tree for double harness in the center a cantle or saddle may be combined with it. This saddle-tree, could, however, not be used for single harness, as it is about one-third too long, and in single harness would rub and injure the sides of the horse.

Having thus fully described my invention, what I claim as new, and desire to secure by Letters Patent, is—

The check-hook D provided with the square bolt-head *a* and screw *b*, all in one piece, and secured by the nut *d*, substantially as herein set forth.

In testimony that I claim the foregoing as my own I affix my signature in presence of two witnesses.

PH. H. WIEDERSUM.

Witnesses:
 J. V. WHITE,
 JNO. A. ELLIS.